(12) United States Patent
Kishinami et al.

(10) Patent No.: US 9,179,214 B2
(45) Date of Patent: Nov. 3, 2015

(54) AUDIO EQUIPMENT AND OSCILLATION UNIT

(75) Inventors: Yuichiro Kishinami, Kanagawa (JP);
Yasuharu Onishi, Kanagawa (JP);
Motoyoshi Komoda, Kanagawa (JP);
Yukio Murata, Kanagawa (JP); Jun Kuroda, Kanagawa (JP); Shigeo Satou, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 293 days.

(21) Appl. No.: 13/805,401

(22) PCT Filed: Jul. 14, 2011

(86) PCT No.: PCT/JP2011/004034
§ 371 (c)(1),
(2), (4) Date: Dec. 19, 2012

(87) PCT Pub. No.: WO2012/011255
PCT Pub. Date: Jan. 26, 2012

(65) Prior Publication Data
US 2013/0089218 A1    Apr. 11, 2013

(30) Foreign Application Priority Data

Jul. 23, 2010  (JP) .................... 2010-166544

(51) Int. Cl.
*H04R 1/02*  (2006.01)
*H04R 1/32*  (2006.01)
(Continued)

(52) U.S. Cl.
CPC .............. *H04R 1/32* (2013.01); *H04R 1/403* (2013.01); *H04M 1/6008* (2013.01);
(Continued)

(58) Field of Classification Search
CPC ............... H04R 2217/03; H04R 17/00; H04R 2499/11; H04R 17/10; H04R 7/26; H04R 17/025; H04R 19/02; H04R 1/32; H04R 1/323; H04R 1/403; H04R 17/005; H04R 2307/025; H04R 2307/027; H04R 2400/01; H04R 2460/13; H04R 31/003; H04R 3/00; H04R 5/027; H04R 1/08; H04R 17/02; H04R 1/083; H04R 9/06; H04R 27/00; H04R 3/005; H04R 19/04; H04R 1/406; H04R 9/08; G10K 11/1788
USPC .......... 381/190, 189, 191, 173, 354, 71.1, 77, 381/315, 387, 71.6, 80, 92, 26, 91, 71.2, 381/111–117, 162, 164
See application file for complete search history.

(56) References Cited

U.S. PATENT DOCUMENTS 8,114,697 B2 * 2/2012 Kim et al. .................. 438/51
2003/0163287 A1 * 8/2003 Vock et al. ................. 702/187
(Continued)

FOREIGN PATENT DOCUMENTS

JP    2265398 A    10/1990
JP    03-270282 A    12/1991
(Continued)

OTHER PUBLICATIONS

Communication dated Nov. 4, 2014 from the Japanese Patent Office in counterpart application No. 2012-525313.
(Continued)

*Primary Examiner* — Akelaw Teshale
(74) *Attorney, Agent, or Firm* — Sughrue Mion, PLLC

(57) ABSTRACT

A mobile phone (100) detects at least a direction of an utterance position of a user from the voice input to a plurality of microphones (121,122) and controls an output direction of a voice out of a speaker unit (110) to match the detected utterance position. Accordingly, it is possible to provide sound with sufficient volume only for a specific user without causing noise in the neighborhood. The microphones may form a matrix together with piezoelectric vibrators that form a speaker unit, or may be formed separately from the speaker unit.

4 Claims, 6 Drawing Sheets

(51) Int. Cl.
*H04R 1/40* (2006.01)
*H04M 1/60* (2006.01)
*H04R 17/10* (2006.01)

(52) U.S. Cl.
CPC ............ *H04M 1/6016* (2013.01); *H04R 17/10* (2013.01); *H04R 2217/03* (2013.01); *H04R 2307/027* (2013.01); *H04R 2400/01* (2013.01); *H04R 2430/23* (2013.01); *H04R 2499/11* (2013.01)

(56) References Cited

U.S. PATENT DOCUMENTS

| | | | |
|---|---|---|---|
| 2008/0130921 | A1 | 6/2008 | Tokuhisa et al. |
| 2008/0283751 | A1* | 11/2008 | Kymissis .................... 250/338.3 |
| 2009/0154735 | A1* | 6/2009 | Kim et al. ..................... 381/190 |
| 2010/0156238 | A1 | 6/2010 | Kim et al. |
| 2011/0003550 | A1* | 1/2011 | Klinghult et al. ............ 455/41.3 |
| 2013/0089218 | A1* | 4/2013 | Kishinami et al. ............... 381/92 |

FOREIGN PATENT DOCUMENTS

| | | |
|---|---|---|
| JP | 2004-112213 A | 4/2004 |
| JP | 200540376 A | 2/2005 |
| JP | 2005-165923 A | 6/2005 |
| JP | 2006-067386 A | 3/2006 |
| JP | 2006-114990 A | 4/2006 |
| JP | 2007-266754 A | 10/2007 |
| JP | 2008-017433 A | 1/2008 |
| JP | 2010-148102 A | 7/2010 |
| WO | 2007/026736 A1 | 3/2007 |
| WO | 2007/083497 A1 | 7/2007 |

OTHER PUBLICATIONS

International Search Report of PCT/JP2011/004034 dated Aug. 30, 2011.

Communication dated Jul. 14, 2015, issued by the Japan Patent Office in corresponding Japanese Application No. 2012-525313.

* cited by examiner

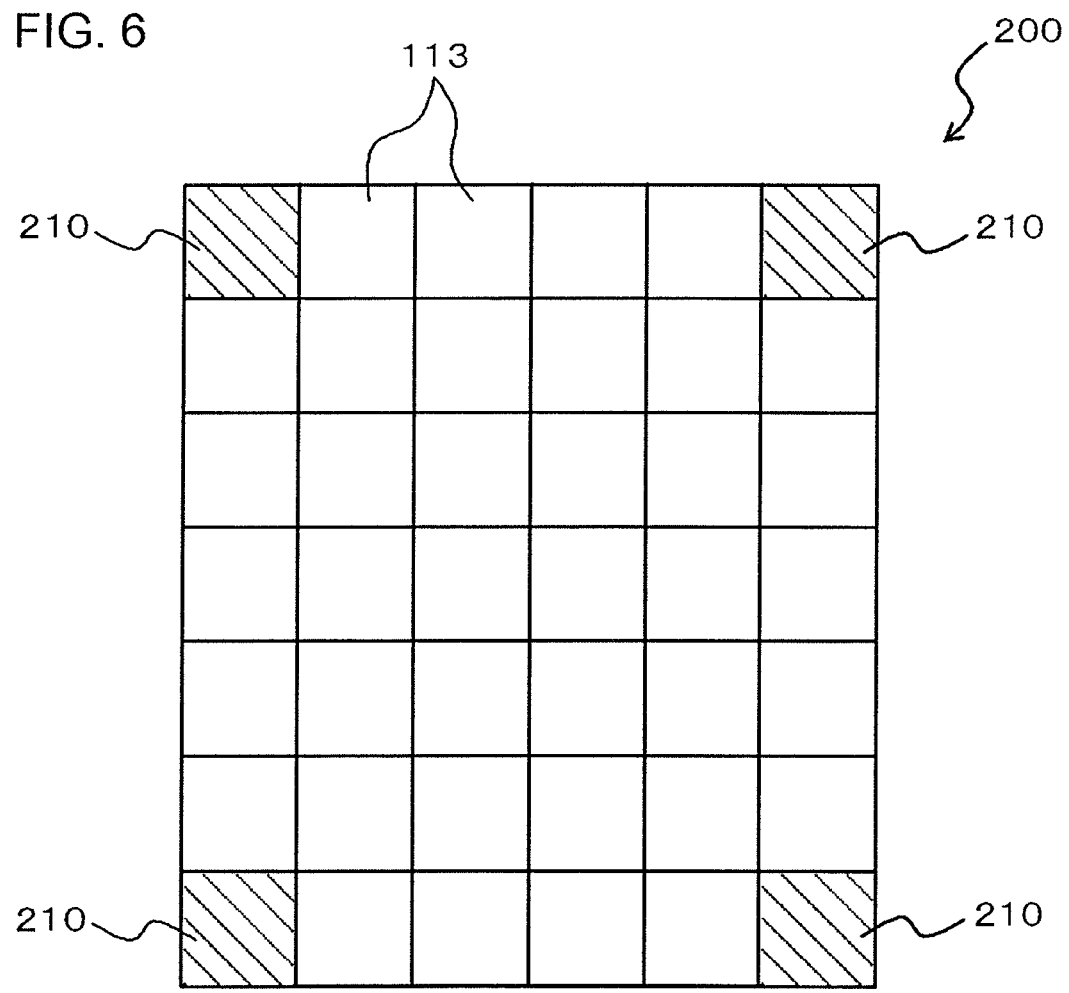

AUDIO EQUIPMENT AND OSCILLATION UNIT

CROSS REFERENCE TO RELATED APPLICATIONS

This application is a National Stage of International Application No. PCT/JP2011/004034 filed Jul. 14, 2011, claiming priority based on Japanese Patent Application No. 2010-166544 filed Jul. 23, 2010, the contents of all of which are incorporated herein by reference in their entirety.

TECHNICAL FIELD

The present invention relates to audio equipment, such as a mobile phone, and in particular, to audio equipment including a microphone and a speaker unit and its oscillation unit.

BACKGROUND ART

In recent years, demand for portable electronic apparatuses, such as mobile phones or notebook computers, has been growing. In such electronic apparatuses, thin mobile terminals having sound functions of a videophone or video reproduction, a hands-free phone, and the like as commercial values are under development. Among such developments, there is a growing demand for high-quality sound and reductions in the size and thickness of an electro-acoustic transducer (speaker device) that is an audio component.

Currently, in an electronic apparatus, such as a mobile phone, an electro-dynamic electro-acoustic transducer is used as an electro-acoustic transducer. The electro-dynamic electro-acoustic transducer is configured to include a permanent magnet, a voice coil, and a vibrating film.

However, there is a limitation in making the electro-dynamic electro-acoustic transducer thin due to its operating principle and structure. On the other hand, Patent Documents 1 and 2 disclose using a piezoelectric element as an electro-acoustic transducer.

Moreover, in addition to the speaker device, various electronic apparatuses, such as a sound wave sensor (refer to Patent Document 3) that detects a distance to an object using sound waves oscillated from a piezoelectric element, are known as other examples of an oscillation unit using a piezoelectric element (Patent Document 4).

RELATED DOCUMENT

Patent Document

[Patent Document 1] Japanese Patent Application Republication (Tarnsration of PCT Application) No. 2007-026736
[Patent Document 2] Japanese Patent Application Republication (Tarnsration of PCT Application) No. 2007-083497
[Patent Document 3] Japanese Unexamined Patent Application Publication No. Hei 03-270282
[Patent Document 4] Japanese Unexamined Patent Application Publication No. 2005-165923

DISCLOSURE OF THE INVENTION

Currently, a mobile phone and the like which are audio equipment have functions besides a call function. As one of these functions, there is a function of watching a movie, music, and the like. Such a mobile phone is used in a state placed close to the side of the head during a call but is used in a state spaced apart from the front of the head when watching a movie, music, and the like.

However, it is not easy to output sound with sufficient volume from the mobile phone in such a state. On the other hand, outputting sound with sufficient volume from such a mobile phone would be annoying for the neighborhood.

The present invention has been made in view of the above problems, and it is an object of the present invention to provide audio equipment such as a mobile phone capable of providing sound with sufficient volume only for a specific user.

Audio equipment of the present invention includes: a directional speaker unit; a plurality of microphones to which a voice of a user is input; and a directivity control unit that detects at least a direction of the user from an input result of the plurality of microphones and controls an output direction of a voice out of the speaker unit on the basis of the detection result.

An oscillation unit of the present invention includes: a piezoelectric vibrator in which a first piezoelectric element is supported by a first elastic member; and a microphone in which a second piezoelectric element is supported by a second elastic member. The plurality of piezoelectric vibrators and the plurality of microphones are disposed so as to form the same matrix.

According to the present invention, it is possible to provide sound with sufficient volume only for a specific user.

BRIEF DESCRIPTION OF THE DRAWINGS

The above-described object and other objects, features, and advantages will become more apparent by preferred embodiments described below and the following accompanying drawings.

FIG. 6 is a schematic front view showing the structure of a speaker unit in a modification.

DESCRIPTION OF EMBODIMENTS

Figure 1:
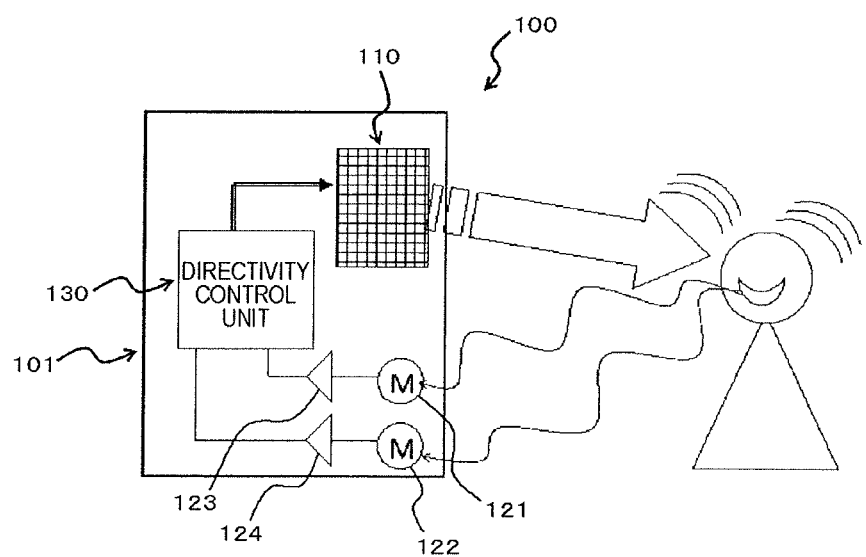
FIG. 1 is a schematic block diagram showing the circuit structure of a mobile phone which is audio equipment of an embodiment of the present invention.

An embodiment of the present invention will be described with reference to FIGS. 1 to 5. As shown in FIG. 1, a mobile phone 100 that is audio equipment of the present embodiment includes: a directional speaker unit 110; a plurality of microphones 121 and 122 to which the voice of a user is input; and a directivity control unit 130 that controls the output direction of the voice out of the speaker unit 110 by detecting at least a direction of an utterance position of the user from the input result of the plurality of microphones 121 and 122.

Figure 2:
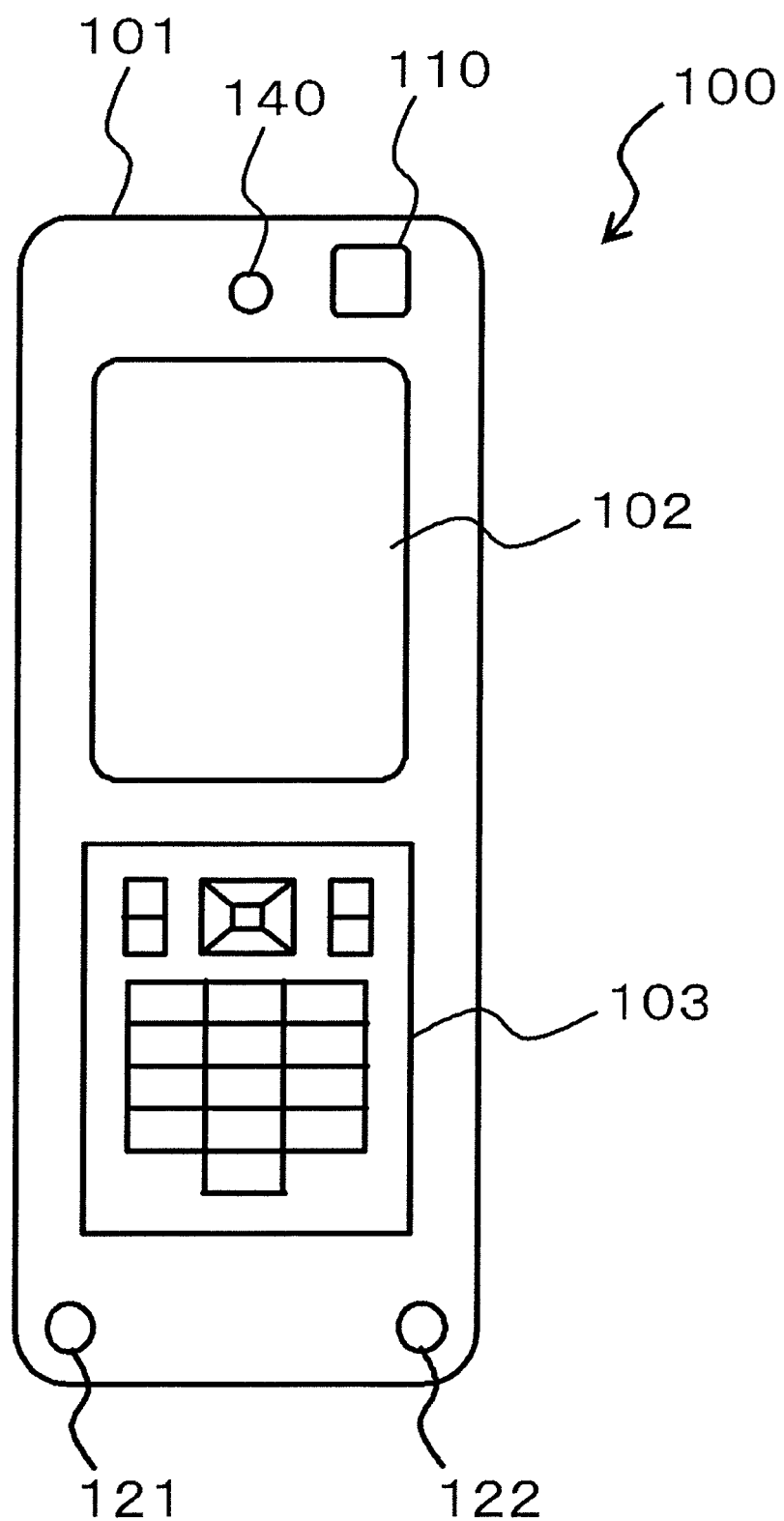
FIG. 2 is a schematic front view showing the appearance of a mobile phone.

More specifically, as shown in FIG. 2, in the mobile phone 100 of the present embodiment, a display unit 102 is disposed in an upper half portion of the front surface of a longitudinal main body housing 101 and a keyboard unit 103 is disposed in a lower half portion.

In addition, microphones 121 and 122 are disposed at the left and right sides of the lower end of the housing 101, respectively. A speaker unit 140 is disposed in the middle of the upper end of the housing 101. The speaker unit 140 is a general electro-dynamic speaker for calls. The housing 101 has the speaker unit 110 beside the speaker unit 140. The speaker unit 140 is a parametric speaker, and is used for hands-free calls, listening to music, and the like.

As shown in FIG. 1, the microphones 121 and 122 are connected to the directivity control unit 130 through amplifiers 123 and 124, respectively. The directivity control unit 130 is connected to the speaker unit 110.

In addition, the microphones 121 and 122 are also connected to a call transmission circuit that wirelessly transmits the input call voice. The speaker unit 140 is connected to a call receiving circuit (not shown in the drawings). This call receiving circuit receives a call voice wirelessly, and the received call voice is output through the speaker unit 140.

The directivity control unit 130 is formed of Large Scale Integration (LSI), such as an Application Specific Integrated Circuit (ASIC), and detects the location of the user in the horizontal direction from outputs of the two microphones 121 and 122 and controls the voice output of the speaker unit 110 in the horizontal direction.

Figure 3:
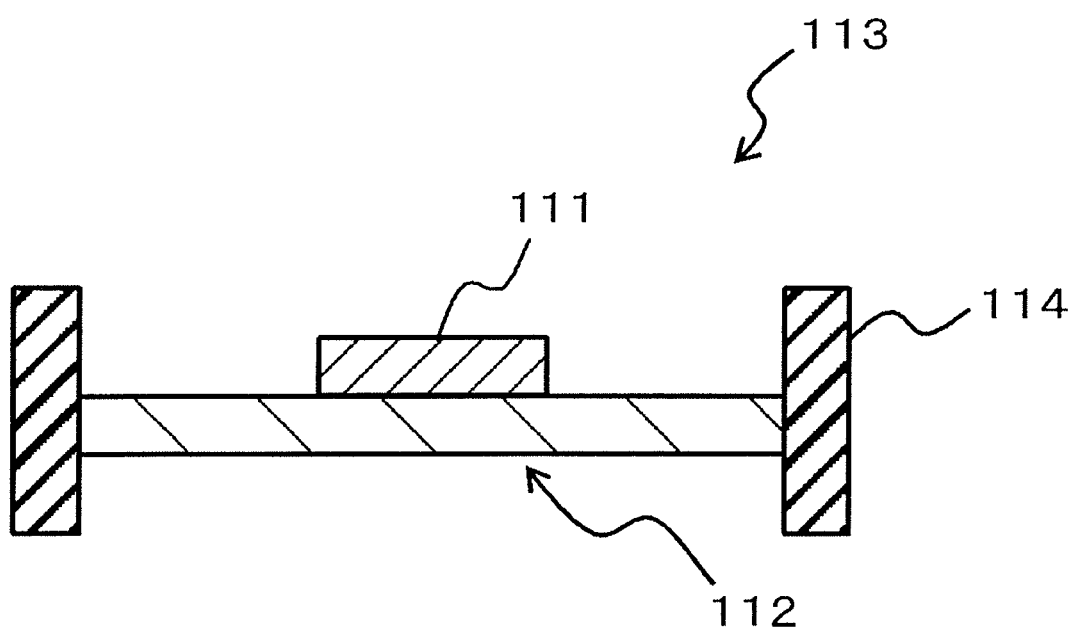
FIG. 3 is a longitudinal sectional side view showing the structure of a main portion of a speaker unit that is an oscillation unit.

As shown in FIG. 3, the speaker unit 110 has a piezoelectric vibrator 113 in which a piezoelectric element 111 is supported by an elastic member 112. The elastic member 112 is supported by a highly rigid frame 114.

Figure 4:
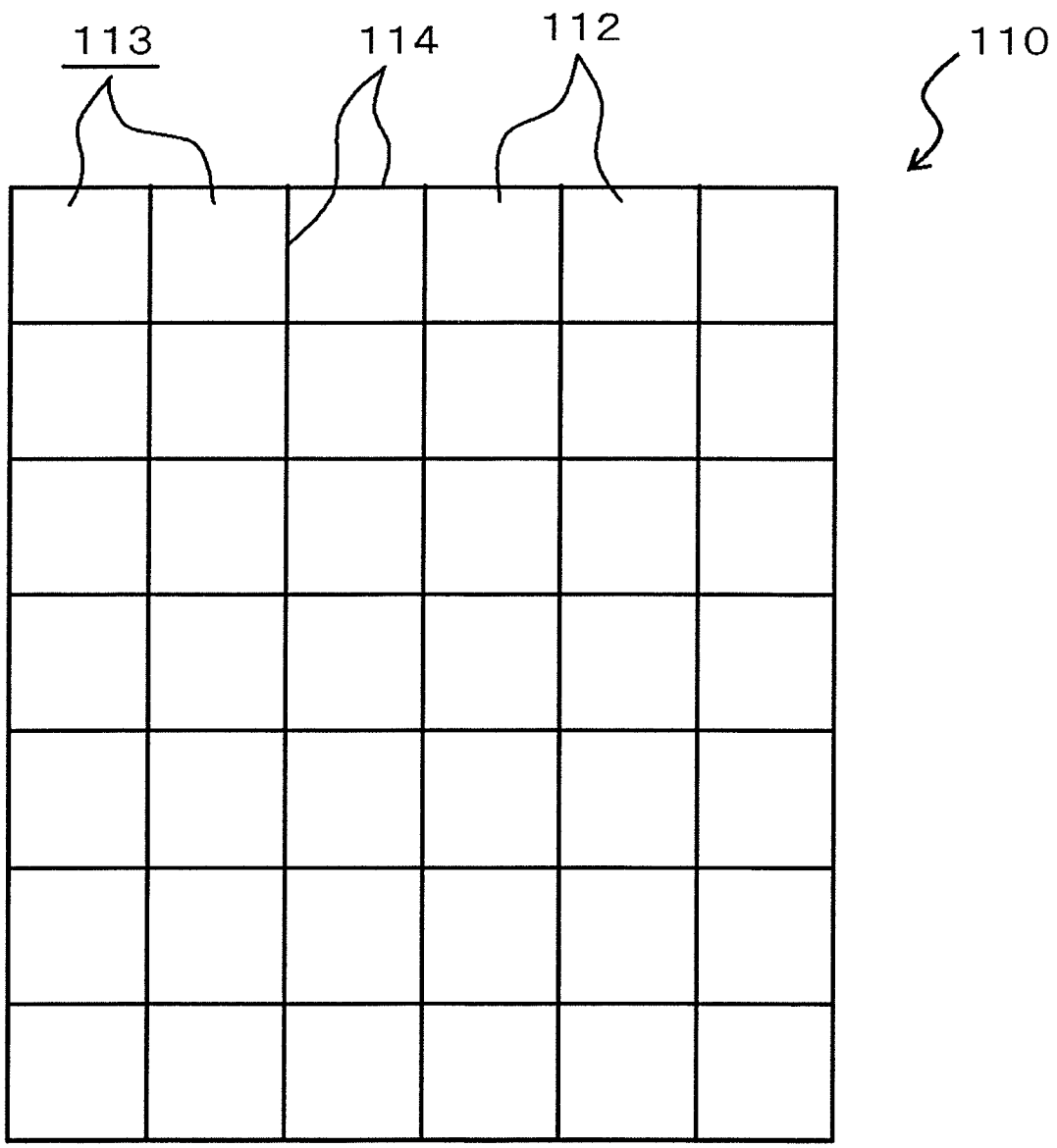
FIG. 4 is a schematic front view showing the structure of a speaker unit.

In addition, as shown in FIG. 4, in the speaker unit 110, a plurality of piezoelectric vibrators 113 are arrayed in a matrix. The directivity control unit 130 outputs a highly directional voice in a desired direction by performing driving control of each of the plurality of piezoelectric vibrators 113.

In addition, materials used to form the piezoelectric element 111 are not particularly limited to both inorganic materials and organic materials as long as they are materials having a piezoelectric effect. For example, these materials are materials with high electromechanical conversion efficiency. For example, these materials are lead Zirco-titanate (PZT), barium titanate ($BaTiO_3$), and the like.

In addition, although not particularly limited, it is preferable that the thickness of the piezoelectric element 111 be equal to or greater than 10 μm, and equal to or less than 500 μm. For example, when a thin film that is a ceramic material, which is a brittle material, and has a thickness less than 10 μm is used as the piezoelectric element 111, chipping, breakage, or the like may occur in the piezoelectric element 111 due to the weakness of the mechanical strength during handling. This makes handling of the piezoelectric element 111 difficult.

In addition, when ceramic with a thickness exceeding 500 μm is used as the piezoelectric element 111, the conversion efficiency of converting electrical energy into mechanical energy is significantly reduced. Accordingly, it is not possible to obtain the satisfactory performance as the speaker unit 110.

Generally, in the piezoelectric ceramic that generates the electrostrictive effect by inputting an electrical signal, the conversion efficiency depends on the electric field strength. Since this electric field strength is expressed as (input voltage)/(thickness in a polarization direction), an increase in the thickness necessarily causes a reduction in conversion efficiency.

In the piezoelectric element 111 of the present invention, an upper electrode layer and a lower electrode layer (not shown in the drawings) are formed on the main surface in order to generate an electric field. Materials of the upper and lower electrode layers are not particularly limited as long as they are materials having electrical conductivity, but it is preferable to use silver or silver/palladium. Silver is used as a general-purpose electrode layer with low resistance, and there is an advantage in the manufacturing process, cost, and the like.

Meanwhile, since silver/palladium is a low resistance material having excellent oxidation resistance, there is an advantage from the viewpoint of reliability. In addition, the thickness of the upper/lower electrode layer is not particularly limited, but it is preferable that the thickness be equal to or greater than 1 μm, and equal to or less than 50 μm.

For example, if the thickness of each of the upper and lower electrode layers is equal to or less than 1 μm, the upper and lower electrode layers cannot be uniformly formed since the film thickness is small. Accordingly, the conversion efficiency could be lowered. In addition, as a technique for forming thin-film upper and lower electrode layers, there is a method of applying a conductor in the form of paste.

However, when the piezoelectric element 111 is a polycrystal such as a ceramic, the wetting state at the time of application is poor since the surface state of the piezoelectric element 111 is a satin-finished surface. Accordingly, the film thickness of an electrode layer cannot be made uniform unless the electrode layer has a certain level of thickness.

On the other hand, when the film thickness of each of the upper and lower electrode layers exceeds 100 μm, there is no particular problem in manufacturing, but the upper and lower electrode layers become constraint surfaces for a piezoelectric ceramic material which is the piezoelectric element 111. As a result, the energy conversion efficiency is lowered.

In the piezoelectric element 111 of the speaker unit 110 of the present embodiment, the main surface on one side thereof is constrained by the elastic member 112. The elastic member 112 has a function of adjusting the fundamental resonance frequency of the piezoelectric element 111. As shown in the following Expression, the fundamental resonance frequency f of the mechanical piezoelectric vibrator 113 depends on the load weight and compliance.

$$f=1/(2\pi L\sqrt{mc}) \quad \text{[Expression 1]}$$

Here, "m" describes a mass, and "C" describes compliance.

Since the compliance is the mechanical rigidity of the piezoelectric vibrator 113, the fundamental resonance frequency can be controlled by controlling the rigidity of the piezoelectric element 111.

For example, it is possible to shift the fundamental resonance frequency to the low frequency region by selecting a material with a high modulus of elasticity or reducing the thickness of the elastic member 112. On the other hand, it is possible to shift the fundamental resonance frequency to the high frequency region by selecting a material with a high modulus of elasticity or increasing the thickness of the elastic member 112.

Since the fundamental resonance frequency is controlled with the shape or material of the piezoelectric element 111, there has been a problem in design constraints, cost, and reliability. On the other hand, in the present embodiment, the fundamental resonance frequency can be easily adjusted to the desired value by changing the elastic member 112 which is a component.

Meanwhile, materials used to form the elastic member 112 are not particularly limited as long as they are materials having a high modulus of elasticity for the ceramic, which is a brittle material, such as metal or resin. However, from the viewpoint of workability, cost, or the like, general-purpose materials, such as phosphor bronze and stainless steel, are preferable.

In addition, it is preferable that the thickness of the elastic member 112 be equal to or greater than 5 µm, and equal to or less than 1000 µm. When the thickness of the elastic member 112 is less than 5 µm, the mechanical strength of the elastic member 112 is low. Accordingly, a function as a constraint member may be damaged. In addition, due to a reduction in the machining accuracy, errors in the mechanical vibration characteristics of the piezoelectric elements 111 occur between manufacturing lots.

In addition, when the thickness of the elastic member 112 exceeds 1000 µm, the constraint to the piezoelectric element 111 due to an increase in the rigidity is strengthened. Accordingly, there is a problem in that attenuation of the amount of vibration displacement is caused. In addition, for the elastic member 112 of the present embodiment, it is preferable that the modulus of longitudinal elasticity, which is an indicator showing the rigidity of a material, be equal to or greater than 1 GPa, and equal to or less than 500 GPa. As described above, when the rigidity of the elastic member 112 is too low or too high, the characteristics or the reliability as a mechanical vibrator could be damaged.

Hereinafter, the principle of operation of the speaker unit 110 of the present embodiment will be described. The speaker unit 110 of the present embodiment emits ultrasonic waves into the air after AM (Amplitude Modulation) modulation, DSB (Double Sideband modulation) modulation, SSB (Single-Sideband modulation) modulation, or FM (Frequency Modulation) modulation. Then, an audible sound appears due to non-linear characteristics when the ultrasonic waves propagate in the air.

As an example of non-linear characteristics, a phenomenon may be mentioned in which transition from laminar flow to turbulent flow occurs as the Reynolds number expressed by the ratio of the inertial effect to the viscosity effect of the flow increases.

Since there are fine disturbances in sound waves in the fluid, the sound waves propagate in a non-linear shape. The amplitude of the sound waves in a low frequency band is non-linear and the amplitude difference is very small. Accordingly, the sound waves are generally treated as a phenomenon of the linear theory. In contrast, in the case of ultrasonic waves, non-linearity can be easily observed. Accordingly, when the ultrasonic waves are emitted into the air, harmonics due to the non-linearity are noticeably generated.

The sound waves are in a dense state in which molecular groups are densely mixed in the air and in a sparse state in which molecular groups are sparsely mixed in the air. Accordingly, when it takes more time to restore air molecules than to compress them, the air that cannot be restored after compression collides with the air molecules that propagate continuously. As a result, impact waves are generated, and this generates an audible sound.

Figure 5:
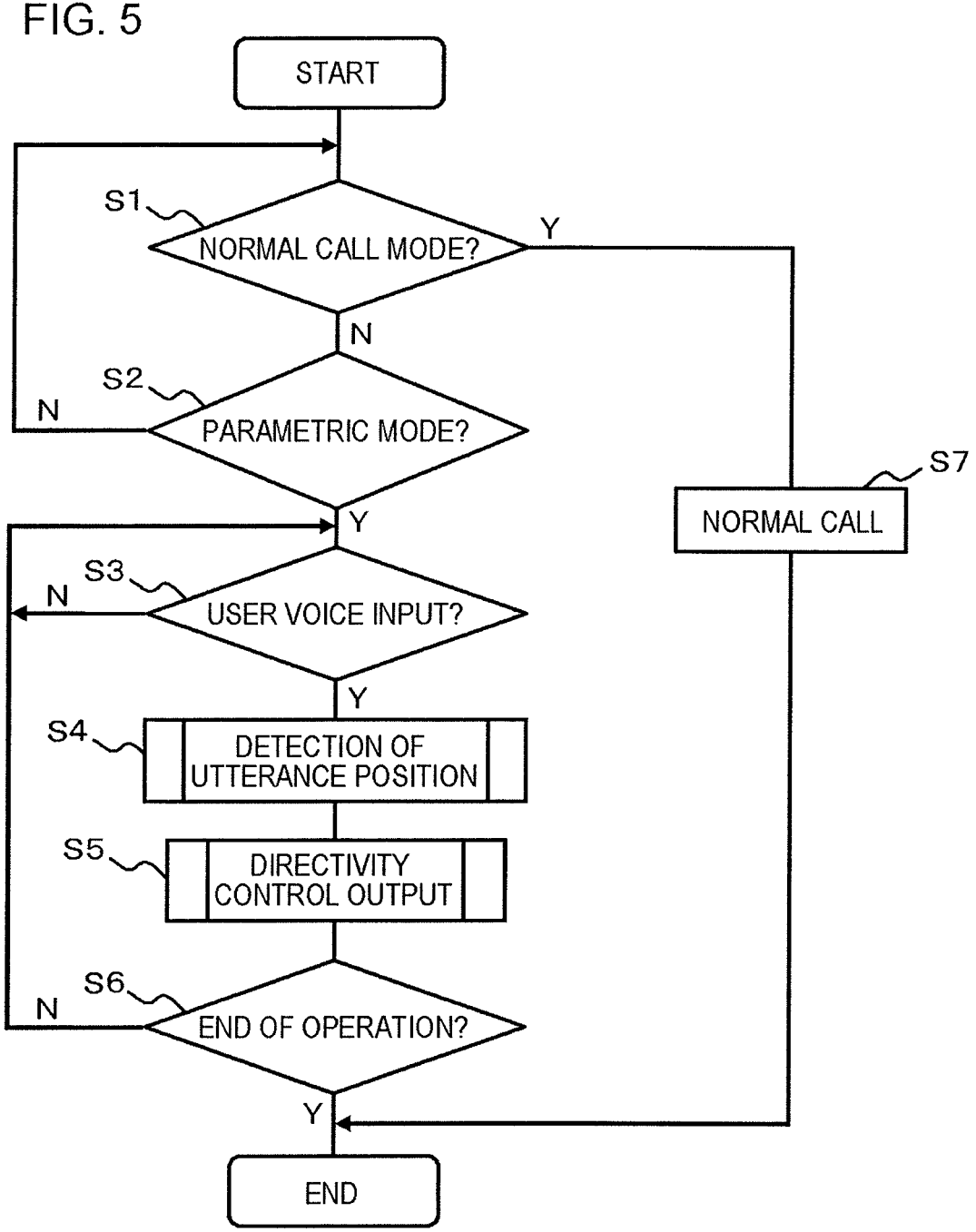
FIG. 5 is a flow chart showing the processing operation of a mobile phone.

For example, as shown in FIG. 5, during a normal call (step S1-Y), the mobile phone 100 of the present embodiment is placed close to the side of the head, the voice of the user is input through the two microphones 121 and 122 at the lower end, and the voice of a partner (not shown in the drawings) is output from the speaker unit 140 at the upper end (step S7).

However, the mobile phone 100 of the present embodiment is also used for hands-free calls, listening to music, and the like by the parametric mode using the speaker unit 110 (step S2-Y), for example, as well as in the general use method described above.

In such a case, the mobile phone 100 is placed at a predetermined distance in front of the head of the user, for example, as shown in FIG. 1. For example, when the user inputs the start of a hands-free call or the listening of music with his or her voice, this voice is input into the two microphones 121 and 122 (step S3-Y).

Then, the directivity control unit 130 calculates the difference between the times of the voice input into the two microphones 121 and 122, and detects a direction of the utterance position from the difference of the times (step S4). Then, a highly directional voice is output in the detected direction from the speaker unit 110 (step S5).

In the mobile phone 100 of the present embodiment, the voice of the speaker unit 110 described above is highly directional. Accordingly, it is possible to provide sound with sufficient volume to the user without causing noise in the neighborhood.

In particular, in the mobile phone 100 of the present embodiment, the utterance position of the user is continuously detected in real time, and the output direction of the voice out of the speaker unit 110 is adjusted in real time. For this reason, even if the location of the user is changed during the listening of music or the like, it is possible to provide a highly directional voice to the user accurately.

In addition, in the mobile phone 100 of the present embodiment, the two microphones 121 and 122 are disposed at the positions spaced apart from each other in the horizontal direction. For this reason, the utterance position of the user can be satisfactorily detected in the horizontal direction.

In addition, in the mobile phone 100 of the present embodiment, since the two microphones 121 and 122 are disposed at the positions spaced apart from each other in the horizontal direction as described above, the utterance of the user can be satisfactorily input in both the case in which the mobile phone 100 is used with held by the right hand, and the case in which the mobile phone 100 is used with held by the left hand.

In addition, the present invention is not limited to the present embodiment and various modifications are allowed within the range without departing from the subject matter. For example, in the above-described embodiment, it has been illustrated that the two microphones 121 and 122 are disposed at the positions spaced apart from each other in the horizontal direction and the highly directional voice of the speaker unit 110 is controlled in the horizontal direction.

However, three or more microphones may be disposed in a mobile phone (not shown in the drawings) so as to be spaced apart from each other, and therefore the direction of the highly directional voice of the speaker unit 110 may be controlled by detecting the utterance position of the user in a three-dimensional manner.

In this case, the detection accuracy of the utterance position is improved when the distances between the three or more microphones are increased. Accordingly, for example, it is preferable to dispose microphones in four corners of all sides of the front surface of a mobile phone (not shown in the drawings).

In addition, in such a mobile phone or the like, the speaker unit 110 may be disposed approximately in the middle of a plurality of microphones. In addition, the directivity control unit 130 may detect at least a direction of the utterance position from detection results of a plurality of microphones (not shown in the drawings).

For example, if microphones are disposed in the four corners of the front surface of a mobile phone and the speaker unit 110 is disposed approximately in the middle of the front surface of the mobile phone as described above, it is possible to detect the utterance position with high precision. In addition, a highly directional voice can be output to this position with high precision (not shown in the drawings).

In addition, in the above embodiment, it has been illustrated that the speaker unit 110 and the microphones 121 and 122 are separately formed. However, as a speaker unit 200 that is an oscillation unit shown in FIG. 6, some of the plurality of piezoelectric vibrators 113 arrayed in a matrix may be replaced with microphones 210.

In this case, the directivity control unit 130 detects the utterance position of the user using the microphones 210 of the speaker unit 200. Also in such a speaker unit 200, in order to improve the detection accuracy of the utterance position, it is preferable that some of the plurality of piezoelectric vibrators 113 arrayed in a matrix, which are located on the outer edge, be replaced with the microphones 121 and 122. In addition, the microphones 121 and 122 may have the same structure as the piezoelectric vibrator 113.

More specifically, the microphones 210 may be disposed in four corners of the matrix configured to include the plurality of piezoelectric vibrators 113, as shown in the drawings. In this case, the directivity control unit 130 can detect the utterance position in a three-dimensional manner from detection results of the microphones 210 disposed in the four corners.

In this case, since a distance between the plurality of microphones 210 is reduced compared with that in the mobile phone 100 described above, the detection accuracy of the utterance position may be lowered. However, since the microphones 210 are built in the speaker unit 200 from the beginning, the detection accuracy of the utterance position can be tuned with high precision in advance. In addition, although there are various types of mobile phones 100, such as folder-type mobile phones, the above-described speaker unit 200 is not influenced from the structure of such a mobile phone 100.

In addition, in the above embodiment, the speaker unit 110 in which a plurality of piezoelectric vibrators 113, in which the piezoelectric element 111 is supported by the elastic member 112, are arrayed in a matrix has been illustrated as a speaker unit that can control the output direction of a highly directional voice.

However, a speaker unit or the like may also be implemented in which one piezoelectric vibrator 113 is swingably supported in two axial directions, such as up, down, left, and right, and is made to move in each direction using a solenoid or the like (not shown in the drawings).

In addition, it is a matter of course that the plurality of embodiments and the plurality of modifications described above may be combined within the range where the contents do not conflict with each other. In addition, while the structure and the like of each unit have been specifically described in the above embodiments, the structure and the like may be variously changed within the range where the invention of this application is satisfied.

This application claims priority to Japanese Patent Application No. 2010-166544, filed on Jul. 23, 2010, and the entire contents of which are incorporated herein.

The invention claimed is:

1. Audio equipment comprising:
   a directional speaker unit;
   a plurality of microphones to which a voice of a user is input; and
   a directivity control unit that detects at least a direction of the user from an input result of the plurality of microphones and controls an output direction of a voice out of the directional speaker unit on the basis of the detection result,
   wherein each of the microphones has a first piezoelectric element and a first elastic member that supports the first piezoelectric element,
   wherein, in the directional speaker unit, a plurality of piezoelectric vibrators in which a second piezoelectric element is supported by a second elastic member is arrayed together with the microphones so as to form a matrix,
   wherein a first microphone among the microphones is disposed at a first corner among four corners of the matrix,
   wherein a second microphone among the microphones is disposed at a second corner among the four corners of the matrix, the second corner being a different corner from the first corner,
   wherein no microphone is disposed between the first corner and the second corner in the matrix, and
   wherein the piezoelectric vibrators are disposed between the first corner and the second corner in the matrix.

2. The audio equipment according to claim 1,
   wherein the directional speaker unit is disposed between the plurality of microphones.

3. The audio equipment according to claim 1,
   wherein the microphones receive an input of a call voice of the user,
   the audio equipment further comprises a call transmission unit that wirelessly transmits the call voice input to the microphone, and
   the directivity control unit detects an utterance position of the user from the wirelessly transmitted call voice.

4. An oscillation unit comprising:
   a piezoelectric vibrator in which a first piezoelectric element is supported by a first elastic member; and
   a microphone in which a second piezoelectric element is supported by a second elastic member,
   wherein a plurality of the piezoelectric vibrators and a plurality of the microphones are disposed so as to form a matrix,
   wherein the oscillation unit further comprises a directivity control unit that detects at least a direction of a user from an input result of the plurality of the microphones and controls an output direction of a voice out of a directional speaker unit on the basis of the detection result,
   wherein a first microphone among the microphones is disposed at a first corner among four corners of the matrix,
   wherein a second microphone among the microphones is disposed at a second corner of the four corners of the matrix, the second corner being a different corner from the first corner,
   wherein no microphone is disposed between the first corner and the second corner in the matrix, and
   wherein the piezoelectric vibrators are disposed between the first corner and the second corner in the matrix.

* * * * *